United States Patent
Schuehler et al.

(10) Patent No.: US 11,693,079 B2
(45) Date of Patent: Jul. 4, 2023

(54) DEVICE FOR DETERMINING A POSITION OF A TRANSMITTER AND CORRESPONDING METHOD

(71) Applicant: Fraunhofer-Gesellschaft zur Foerderung der angewandten Forschung e.V., Munich (DE)

(72) Inventors: Mario Schuehler, Effeltrich (DE); Lars Weisgerber, Ebersbach-Neugersdorf (DE); Johannes Arendt, Erlangen (DE); Rainer Wansch, Baiersdorf (DE); Heinrich Milosiu, Erlangen (DE); Frank Oehler, Adelsdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/059,794

(22) Filed: Aug. 9, 2018

(65) Prior Publication Data
US 2018/0348327 A1    Dec. 6, 2018

Related U.S. Application Data

(63) Continuation of application No. PCT/EP2017/053143, filed on Feb. 13, 2017.

(30) Foreign Application Priority Data

Feb. 12, 2016  (DE) .......................... 102016202205.9
Jul. 20, 2016  (DE) ...................... 10 2016 213 235.0

(51) Int. Cl.
*G01S 3/16*    (2006.01)
*G01S 13/74*   (2006.01)
(Continued)

(52) U.S. Cl.
CPC .............. *G01S 3/16* (2013.01); *G01S 5/0221* (2013.01); *G01S 13/74* (2013.01); *H04W 64/00* (2013.01)

(58) Field of Classification Search
CPC .......... G01S 5/0221; G01S 13/74; G01S 3/16; H04W 64/00
See application file for complete search history.

(56) References Cited

U.S. PATENT DOCUMENTS 4,654,667 A    3/1987    Apostolos et al.
5,907,809 A    5/1999    Molnar et al.
(Continued)

FOREIGN PATENT DOCUMENTS

CN    105305018 A    2/2016
JP    2001500970 A    1/2001
(Continued)

OTHER PUBLICATIONS

Giorgetti, Gianni et al., "Single-Anchor Indoor Localization Using a Switched-Beam Antenna", IEEE Communications Letters, vol. 13, No. 1, Jan. 2009, pp. 1-3.
(Continued)

*Primary Examiner* — Dinh Nguyen
(74) *Attorney, Agent, or Firm* — Perkins Coie LLP; Michael A. Glenn (57) ABSTRACT

What is disclosed is a device for determining a piece of information on a position of a transmitter, comprising an antenna device, a signal processing device and a data processing device. Thus, the antenna device comprises several different directional characteristics, the directional characteristics each relating to at least a set of spatially different receive sensitivities of the antenna device. The antenna device receives signals from the transmitter with different directional characteristics, the signal processing device pro-
(Continued)

cessing the signals received and establishing a respective amplitude value of a field strength. The data processing device establishes the information on the position of the transmitter based on the directional characteristics and the amplitude values having been established for the associated signals received. Additionally, a corresponding method is disclosed.

16 Claims, 4 Drawing Sheets

(51) Int. Cl.
*G01S 5/02* (2010.01)
*H04W 64/00* (2009.01)

(56) References Cited

U.S. PATENT DOCUMENTS

| | | | |
|---|---|---|---|
| 8,433,337 | B2 | 4/2013 | Chin |
| 9,183,717 | B1 | 11/2015 | Diorio et al. |
| 9,349,032 | B1* | 5/2016 | Diorio ................ G06K 7/10425 |
| 2004/0137909 | A1* | 7/2004 | Gerogiokas ........... H04W 16/04 |
| | | | 455/453 |
| 2005/0110641 | A1 | 5/2005 | Mendolia et al. |
| 2007/0197229 | A1 | 8/2007 | Kalliola et al. |
| 2009/0002165 | A1 | 1/2009 | Tuttle |
| 2010/0073260 | A1* | 3/2010 | Fujita .................. H01Q 25/008 |
| | | | 343/700 R |
| 2010/0309058 | A1 | 12/2010 | Kalliola et al. |
| 2011/0169613 | A1 | 7/2011 | Chen et al. |
| 2012/0062381 | A1* | 3/2012 | Liu ....................... G01S 5/0252 |
| | | | 340/572.1 |
| 2016/0042206 | A1* | 2/2016 | Pesavento ............ H01Q 1/2216 |
| | | | 235/385 |
| 2016/0057210 | A1 | 2/2016 | Decusatis et al. |

FOREIGN PATENT DOCUMENTS

| | | |
|---|---|---|
| JP | 2004507138 A | 3/2004 |
| JP | 2004333414 A | 11/2004 |
| JP | 2005207837 A | 8/2005 |
| JP | 2006050477 A | 2/2006 |
| JP | 2007065950 A | 3/2007 |
| JP | 2009527757 A | 7/2009 |
| WO | 9812571 A1 | 3/1998 |
| WO | 0215334 A1 | 2/2002 |

OTHER PUBLICATIONS

Hood, Bryan N. et al., "Estimating DoA From Radio-Frequency RSSI Measurements Using an Actuated Reflector", IEEE Sensors Journal, vol. 11, No. 2, Feb. 2011, pp. 413-417.

Kalis, A. et al., "Direction Finding in IEEE802.11 Wireless Networks", IEEE Transactions on Instrumentation and Measurement, vol. 51, No. 5, Oct. 2002, pp. 940-948.

Nguyen, D. L. , "Switched Beam Array Antenna for 2.45 GHz RFID Localisation", Dissertation, The University of Hull, Nov. 2011, pp. 1-135.

Passafiume, M. et al., "On the duality of Phase-based and Phase-less RSSI Music algorithm for Direction of Arrival estimation", Proc. of the 3rd International Conference on Circuits, Systems, Communications, Computers and Applications (CSCCA)., 2014, pp. 48-54.

Shelton, J.P. et al., "Multiple Beams from Linear Arrays", IRE Transactions on Antennas and Propagation; vol. 9; No. 2, Mar. 1961, pp. 154-161.

Volmer, C. et al., "An eigen-analysis of compact antenna arrays and its application to port decoupling", IEEE Transactions on Antennas and Propagation; vol. 56; No. 2, Feb. 2008, pp. 360-370.

* cited by examiner

DEVICE FOR DETERMINING A POSITION OF A TRANSMITTER AND CORRESPONDING METHOD

CROSS-REFERENCE TO RELATED APPLICATIONS

This application is a continuation of copending International Application No. PCT/EP2017/053143, filed Feb. 13, 2017, which is incorporated herein by reference in its entirety, and additionally claims priority from German Applications No. 102016202205.9, filed Feb. 12, 2016, and 102016213235.0, filed Jul. 20, 2016, which are also incorporated herein by reference in their entirety.

BACKGROUND OF THE INVENTION

The invention relates to a device for determining at least one piece of information on a position of a transmitter. Additionally, the invention relates to a method for determining at least one piece of information on a position of at least one transmitter.

In the field of logistics and production technology, radio-frequency transponders ("radio-frequency identification" (RFID) transponders or RFID tags) allowing identification of objects are used. These transponders are typically passive and are excited by a radio-frequency electromagnetic field in the form of an excitation signal. The transponder uses this signal and returns a modulated signal to the RFID reader in response to the excitation. The response signal includes information of the transponder that can be evaluated by the reader. This means that an object can be clearly identified and allocated via a transponder.

Apart from the identification of objects, localization of objects is also desirable. For this, first, directional information has to be established that provides information on what direction relative to the position of the reader the transponder returns its answer from. By using a further reader, i.e. spatially separated from the first one, directional information of both can be used to establish the location of the object within a plane. Spatial localization requires a third reader.

With the help of this radio-frequency identification of objects and their localization, different good flow processes can be managed and optimized. In the case of automated detection of objects on a pallet moved through a gate, localization allows automatic detection of the direction. Entry and exit can be distinguished, for example.

Another application is finding stowed goods provided with RFID transponders in a warehouse.

Modern systems as are employed when passing gates or in moving units usually consists of a reader having one to four and maybe even more terminals which allow an antenna each to be connected. Using these antennas, the radio-frequency excitation signal can be sent out and response signals of the transponders be received.

In readers having only one terminal, normally, an antenna consisting of a single radiator is connected. This allows merely detecting transponders, but not establishing the position of direction of the transponder. When several antennas are connected to the reader, usually sequential switching between the antennas takes place within the reader. By local distribution of the antennas, the position of the transponders can be deduced. However, the directional information is very inaccurate or ambiguous and the distribution of the antennas also involves high space requirements and hence high installation effort.

The directional estimation can be established with a known algorithm such as MUSIC ("multiple signal characterization") or ESPRIT ("estimation of signal parameters via rotational invariance technique"). For this, however, the magnitude and phase of the signals received have to be established. Typical RFID readers do not offer that option since the same provide for each identified transponder merely a measure of the amplitude of the received field strength ("received signal strength indication" (RSSI)). This means that only the magnitude, but not the base is available so that known algorithms cannot be applied.

[1] presents an RSSI-based method for direction-finding in wireless networks. By successively switching radiation diagrams with decreasing beam width, the transmitter to be found can be allocated to one sector. Here, however, the resolution accuracy of the direction of incidence is only given by the most narrow beam width, which results in large antenna apertures and expensive beam-forming networks, respectively.

Regarding resolution accuracy, the approach presented in [2] also depends on the beam width. Here, a fixed main beam is mechanically pivoted until the direction having the strongest RSSI value has been found.

A further RSSI-based method is shown in [3]. Here, an allocation between RSSI value and direction in space is obtained by the spatial arrangement of the antennas. Here, the resolution depends on the beam width of the individual radiators.

An RSSI-based approach in combination with the direction estimation algorithm MUSIC is presented in [4]. By searching for the suitable steering vector, the signal covariance matrix is inferred without measuring any phase information. The accuracy of the approach relates strongly to the directivity of the individual antennas.

U.S. Pat. No. 8,433,337 B2 shows an approach where the signals from two antennas are combined with one another in four different ways via a 90° hybrid coupler and an additional switchable phase shifter. Thereby, the phase information is converted into amplitude information such that the phase relation between two antennas can be inferred from the RSSI values. Even with more than two antennas, the same are always combined in pairs while the different pairs are activated after one another. Basically, switching is performed between different directional characteristics. However, these have low directivity, since merely two elements are "active" at the same time. By considering noise, ambiguities can occur which can make direction finding impossible. Here, the accuracy also depends on the accuracy of the directivity of the individual elements.

In [5], the signals of four antennas are combined. The antennas are connected to an RFID reader via a so-called Butler-matrix. Within the reader, switching is performed between input ports of the Butler matrix. The angle of incidence within a plane can be deduced from the RSSI values and the characteristics of the Butler matrix. An unambiguous spatial determination of direction, i.e. in two planes, is consequently not possible due to the spatial symmetry of the directional characteristics.

SUMMARY

According to an embodiment, a device for determining at least one piece of information on a position of at least one transmitter may have: an antenna device, a signal processing device and a data processing device, wherein the antenna device has several different directional characteristics, wherein the directional characteristics each relate to at least a set of spatially different receive sensitivities of the antenna device, wherein the antenna device is configured to receive at least one respective signal from the transmitter with different directional characteristics, wherein the signal processing device is configured to process the signals received from the antenna device and establish a respective amplitude value of a field strength of the signal received, and wherein the data processing device is configured to establish the information on the position of the transmitter based on the directional characteristics and the amplitude values established from the respective associated signals received.

Another embodiment may have a method for determining at least one piece of information on a position of at least one transmitter, wherein signals emanating from the transmitter are received with different directional characteristics which each relate to spatially different receive sensitivities, wherein a respective amplitude value of a field strength of the signals received is established, and wherein the information on the position of the transmitter is established starting from the directional characteristics and the amplitude value established from the respective associated signals received.

According to still another embodiment, a device for determining at least one piece of information on a position of at least one transmitter may have: an antenna device, a control device, a signal processing device and a data processing device, wherein the antenna device has several different directional characteristics, wherein the directional characteristics each relate to at least a set of spatially different receive sensitivities of the antenna device, wherein the antenna device is configured to receive at least one respective signal from the transmitter with different directional characteristics, wherein the antenna device has a feed network, the feed network causing different directional characteristics of the antenna device, wherein the feed network is configured to output signals received from the antenna device in a manner partitioned in correspondence with the directional characteristics, wherein the antenna device is configured such that the directional characteristics each have a global maximum which is located each in a certain sector, determined by a pair of an azimuth angle and a co-elevation angle, in an irradiation region associated to the antenna device, wherein the antenna device is configured such that the directional characteristics each have a side maximum which is located each in a sector differing from that sector where the global maximum is located, and which has a predeterminable level distance to a level of the global maximum, wherein the control device is configured to switch the different directional characteristics caused by the feed network for receiving signals emanating from the transmitter, wherein the signal processing device is configured to process the signals received from the antenna device and establish a respective amplitude value of a field strength of the signal received, wherein the data processing device is configured to establish the information on the position of the transmitter based on the switched directional characteristics and the amplitude values established from the respective associated signals received, and wherein the data processing device is configured to establish a statement on a direction of the transmitter relative to the antenna device as information on the position of the transmitter from the amplitude values established in a vector form and data on the directional characteristics.

A device for determining at least one piece of information on a position of at least one transmitter may have an antenna device, a signal processing device and a data processing device. The antenna device comprises several different directional characteristics which each relate at least to a set of spatially different receive sensitivities of the antenna device. The antenna device consequently does not receive the signals in a spatially homogeneous manner, but, depending on the directional characteristic, preferably from different spatial regions. The antenna device is configured to receive at least one respective signal from the transmitter with different directional characteristics. Since each directional characteristic is connected to a special distribution of sensitivity, the signals of the transmitter will also be received as different receive signals. In one implementation, receiving with the different directional characteristics takes place in a temporally offset manner and, in another implementation, at the same time. Thus, in one implementation, it is assumed that the transmitter sends out the signals each basically at the same signal strength. The signal processing device is configured to process the signals received from the antenna device and determine a respective amplitude value of a field strength of the signal received. Finally, the data processing device is configured to establish, based on the directional characteristics and the amplitude values established from the respective associated signals received, the information on the position of the transmitter.

This means that signals are received in the device with different directional characteristics. For the signals received, an amplitude value each is determined which is associated to the corresponding signal and, consequently, also to the respective directional characteristic. In one implementation, the directional characteristics are connected to a direction of a beam so that signals are also primarily received from this direction. The information on the position of the transmitter is established starting from the data of the directional characteristics and the respective amplitude value.

In one implementation, the device additionally comprises a control device. The control device is configured to switch different directional characteristics for receiving signals emanating from the transmitter. Consequently, the data processing device is configured to establish the information on the position of the transmitter based on the switched directional characteristics and the associated established amplitude values. Switching the directional characteristics in one implementation means that only signals of the switched directional characteristic will reach the signal processing device. In an alternative or additional implementation, the antenna device is interfered in such that signals can be received only with the switched directional characteristic.

In one implementation, the control device also serves for switching the directional characteristics using which an excitation signal is sent out. This is required in passive transmitters, like RFID transponders, for example. In one implementation, the directional characteristics also entail a spatially different radiation distribution.

One implementation provides for the data processing device to be configured to establish, from the established amplitude values in a vector form and data on the directional characteristics, a statement on a direction of the transmitter relative to the antenna device as information on the position of the transmitter. In this implementation, it is at least established in which direction the transmitter is positioned relative to the antenna device. A receive vector is constructed from the amplitude value and the data on the respective directional characteristic.

One implementation comprises the antenna device to be configured such that the directional characteristics each comprise a global maximum which is each located in a special sector, determined by a pair of an azimuth angle and a co-elevation angle, in an irradiation region associated to the antenna device. In this implementation, a maximum—in particular with regard to sensitivity—of the directional characteristics is associated to a sector or region around the antenna device. This means that each directional characteristics will receive the strongest signals from its respective associated sector. In one implementation, this also applies for sending out signals using the antenna device. The sector here is defined by two angles.

One implementation provides for the antenna device to be configured such that the directional characteristics each comprise a side maximum which is each located in a sector differing from where the global maximum is arranged, and comprises a predeterminable level distance to a level of the global maximum. In this implementation, smaller side maximums which are located in different sectors are provided with regard to the receive sensitivity. Thus, the side maximums each exhibit a predeterminable level distance to the level of the global maximum. The level here is any measure to be defined for the receive characteristic or, depending on the implementation, for the transmission characteristic of the antenna device.

One implementation comprises the antenna device to be configured such that the directional characteristics each comprise a side maximum which is each located in the same sector as the global maximum, and comprises a predeterminable level distance to a level of the global maximum. In this implementation, the side maximums are located in the same sector as the respective global maximum. Thus, the risk of receiving from neighboring sectors is reduced further and the unambiguity of establishing the information on the position of the transmitter is increased.

One implementation provides for the signal processing device to be an RFID reader which generates a "received signal strength indication" value as an amplitude value of the field strength of the signals received. In the implementation, the transmitters are RFID transponders so that the signal processing device consequently is an RFID reader.

In an alternative implementation, excitation signals are sent out by the device and reflected by the transmitter.

One implementation comprises the signal processing device to be configured to identify the transmitter. This is done in RFID transponders, for example, using identification data transferred in the response signals.

One implementation provides for the device to comprise a signal source. Thus, the signal source is configured to generate an excitation signal. Additionally, the control device is configured to switch a respective directional characteristic for radiating the excitation signal. In an alternative implementation, the excitation signal is emitted in an omnidirectional manner with no control device. The excitation signal in one implementation provides the energy required for the transmitter in order to be able to send out signals. Alternatively, the excitation signal is reflected by the transmitter so that the transmitter is of a purely passive nature. In an alternative case, like, for example, in radar, signals are only reflected (passively).

One implementation comprises the control device to be configured to switch the directional characteristic switched for radiating the excitation signal as a directional characteristic for receiving the signal emanating from the transmitter. In this implementation, the excitation signal is transmitted with a directional characteristic and the receive signal received with the same directional characteristic. Thus, one spatial region is provided with the excitation signal to a special extent and the signal is essentially received only from this spatial region.

In a further variation, the transmitter is an active transmitter which sends out signals of its own accord. These signals are received by the antenna device and subsequently used for establishing the directional information. This means that, in one variation, the device is only of a receiving type.

One implementation provides for the antenna device to comprise several antenna elements. In one implementation, each antenna element is connected to a directional characteristic. Thus, the antenna elements in one implementation are parts of a patch antenna and, alternatively, are dipole antennas, monopole antennas, monopole-type antennas, chip antennas or loop antennas.

One implementation comprises the antenna device to comprise a feed network causing different directional characteristics of the antenna device. The feed network may, for example, be implemented as a Butler matrix.

One implementation provides for the feed network to be configured to output signals received from the antenna device separately in correspondence with the directional characteristics. In one implementation, it is provided for the antenna device to receive respective signals with different directional characteristics at the same time and for the feed network to output all the signals received each in association with the directional characteristics. This is a type of spectral decomposition.

One implementation provides for the antenna device to be implemented as a multibeam antenna. A multibeam antenna comprises several directional characteristics which each are characterized by a beam. The beams in one implementation are directed to different directions.

In addition, in a method for determining at least one piece of information on a position of at least one transmitter, signals emanating from the transmitter with different directional characteristics are received. The directional characteristics each relate to spatially different receive sensitivities so that the signals of the transmitter with the different directional characteristics are each received at different strengths. An amplitude value each is established from the field strengths of the signals received. Finally, the information on the position of the signal are established starting from the directional characteristics—or starting from data describing the different sensitivity distributions—and the amplitude values having been established from the respective signals received.

The above explanations and implementations relating to the device correspondingly also apply to the inventive method. Conversely, method steps may also be realized by implementations of the device so that the discussions relating to the method apply to the device, too.

The invention is to be described again in other words and relating to specific implementations.

In one implementation, a method for establishing the complex receive vectors is provided in order to allow at least an estimation of direction of RFID transponders using RSSI values. In one implementation, the method is based on the combination of an antenna with switchable directional characteristics and an RFID reader which provides a respective RSSI value for signals originating from identified transponders.

BRIEF DESCRIPTION OF THE DRAWINGS

Embodiment of the present invention will be detailed subsequently referring to the appended drawings, in which.

DETAILED DESCRIPTION OF THE INVENTION

Figure 1:
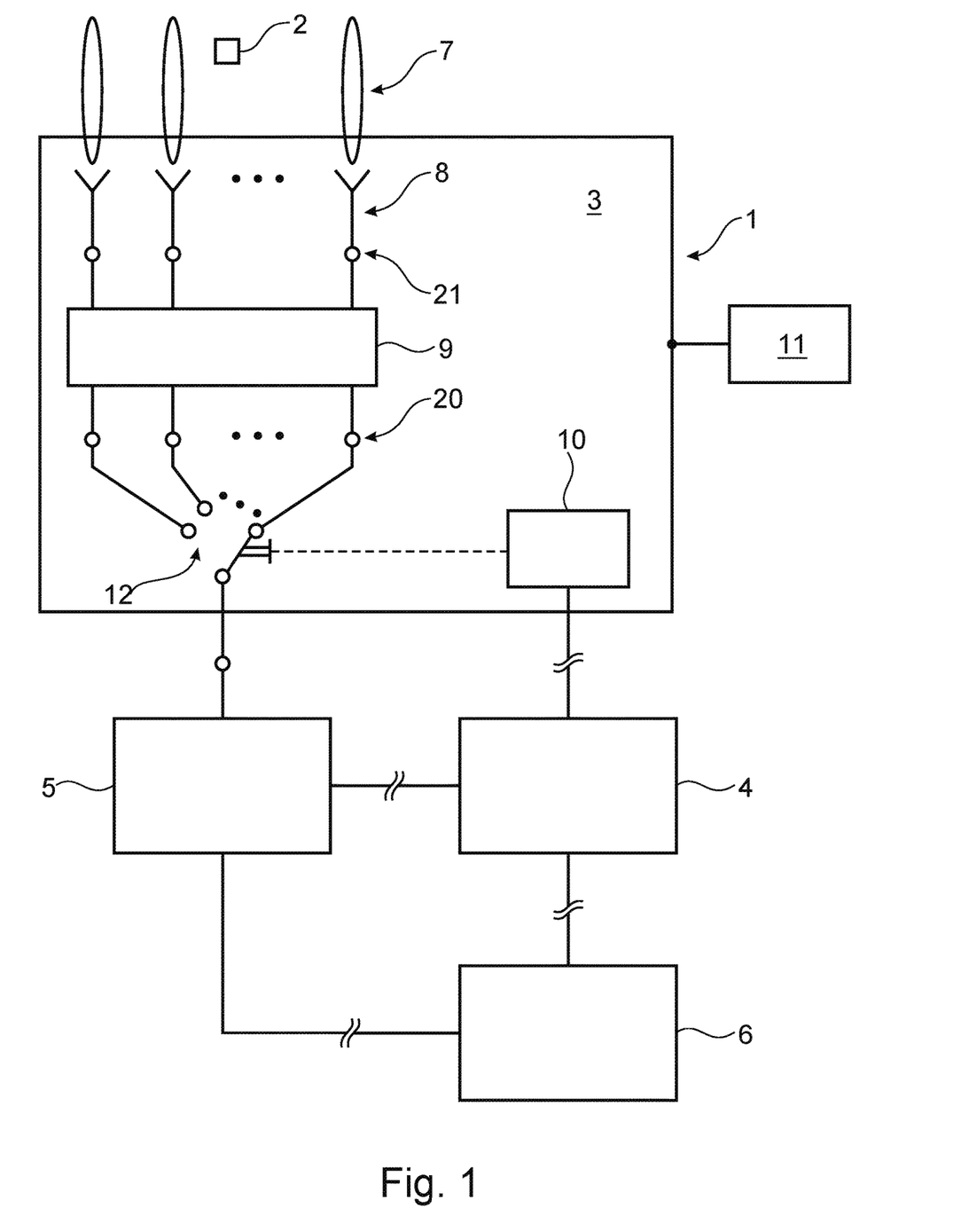
FIG. 1 shows a rough illustration of an inventive device in combination with a transmitter.

FIG. 1 shows an application of the inventive device 1 which in this case is used for establishing the position of a transmitter 2.

For this purpose, the device 1 comprises an antenna device 3 comprising several antenna elements 8, a control device 4, a signal processing device 5, and a data processing device 6. The antenna device 3 in this case is a multibeam antenna.

The control device 4 acts on the antenna device 3 in order to decide which directional characteristic 7 is to be switched so that the signal received via this directional characteristic is fed to the signal processing device 5. The signals received from the antenna device 3 here are output by the feed network 9 in association to the individual directional characteristics 7. A directional characteristic 7 here is associated to each of the n antenna elements 8 of the antenna device 3 and in turn to one of the n antenna inputs 21 (output port would be an alternative term) of the feed network 9. The m signal inputs 20 of the feed network 9 are each connected individually to the signal processing device 5 via the switch 12 illustrated so that only the signal received of this one directional characteristics will be processed further. This allows selecting and/or switching a certain directional characteristic $\vec{C}_k$.

Alternatively, there are several signal processing devices 5—which are not illustrated here—each evaluating a signal received with a directional characteristic. Such an implementation allows parallel evaluation of signals connected to several directional characteristics. For this implementation, it is particularly provided for the feed network 9 to be implemented as a Butler matrix, for example. Put generally: The feed network 9 makes available the respective separate signals for each directional characteristic with which the antenna device 3 has received signals. In this implementation, the feed network 9 outputs the signals received via an associated directional characteristic 7, at the m signal inputs 20. The n antenna elements 8 here are connected to n antenna inputs 21 of the feed network 9.

In the implementation illustrated, however, a single signal processing device 5 for which a respective directional characteristic 7 is switched is sufficient by providing a connection between the signal input 20 of the respective desired directional characteristic 7 and the signal processing device 5. Here, the signal inputs 20 serve for outputting the signals received. The characteristic as a signal input 20 results since it serves as an input for the excitation signals.

The signal processing device 5 establishes a respective amplitude value of the field strength of the signals from the signals received. This means that a measure of the signal strength is generated. At the same time, only a single value results per measurement or per switched directional characteristic.

In one implementation, the signal processing device 5 is particularly configured to extract from the respective signal received a piece of information which the transmitter has impressed on the signal emanating from it. The information may, for example, be measuring values which the transmitter 2 transmits or, for example, at least a symbol of identification of the transmitter 2.

In particular, the signal processing device 5 reduces the signals received to only the amplitude value so that the complex signals—including magnitude and phase—are reduced to a measuring value. The information transmitted with the signal is to be considered separately from the physical characteristics.

Using control logic 10 which in this case is part of the antenna device 3—several directional characteristics 7 are switched and the respective amplitude value is established. The position of the transmitter 2 is subsequently established based on the amplitude values established and the knowledge of the distribution of sensitivity of the directional characteristics 7. The data processing device 6 serves for this which may also comprise a data storage, like for storing the data on the directional characteristics.

The directional characteristics 7 each comprise a main direction due to their beam shape. Thus, signals from different directions and regions are received by the different directional characteristics 7 so that, in the end, the position of the transmitter 2 can be determined using the amplitude values and the associated distributions of receive sensitivities of the directional characteristics—i.e. the data associated to the directional characteristics and describing these in relation to their receive sensitivities.

An example is to be considered where the transmitter 2 is located within a region from which signals can be received only with a directional characteristic 7. Thus, a signal can be received only with this directional characteristic and an amplitude value unequaling zero will result only with this directional characteristic. Thus, the direction where the transmitter is located relative to the antenna device 3 can be deduced from the amplitude values.

When additionally a measure of the field strength to be expected from the transmitter 2 is known, in one implementation, the amplitude value established also allows drawing conclusions as to the distance to the antenna device since the receive sensitivity, for example, decreases with an increasing distance.

Additionally, the device 1 here comprises a signal source for transmitting excitation signals towards the transmitter 2 using the different directional characteristics. Here, the transmitter 2 may be of a purely passive nature, for example, like an RFID tag which reacts to the excitation signal with a response signal. The transmitter may, for example, also be a radar device where the signals emanating from the transmitter 2 are reflection signals. In one implementation—not illustrated here—the signal source 11 is a component of the signal processing device 5 which may, for example, be an RFID reader.

In the case of an application with an RFID tag as a transmitter 2, the signal processing device 5 particularly is a conventional RFID reader. Such an RFID reading device 5 evaluates a signal originating from an RFID tag by extracting data which the RFID tag transfers, for example, like identification data, on the one hand and by generating a so-called "received signal strength indicator" (RSSI) value being an indicator of the field strength of the signals received on the other hand.

The technical bases of the invention will be discussed again below.

An overall spatial region is assumed where the transmitter 2 can be located and which is covered by the directional characteristics of the antenna device 3.

The overall spatial region or irradiation region $\Omega$ is defined as follows:

$$\Omega = \left\{ \vec{\omega} = \begin{pmatrix} \phi \\ \theta \end{pmatrix} : \phi_l \leq \phi \leq \phi_u \ \& \ \theta_l \leq \theta \leq \theta_u \right\} \quad (1)$$

Thus, $\varphi$ is the azimuth angle and $\theta$ the co-elevation angle. The angles each comprise a lower threshold $\varphi_l$ and $\theta_l$ and an upper threshold $\varphi_u$ and $\theta_u$. Respective spatial sectors $\Omega_{i,j}$ are formed which a respective directional characteristic $\vec{C}_k$ of the antenna device corresponds with.

The directional characteristics $\vec{C}_k$ in one implementation are characterized by the fact that they comprise their global maximum in an associated sector. In addition, there are no further maximums in any of the remaining sectors up to a certain predeterminable level distance below the global maximum.

The sector $\Omega_{i,j}$ is given by the following definition:

$$\Omega_{ij} = \left\{ \vec{\omega} = \begin{pmatrix} \phi \\ \theta \end{pmatrix} : \phi_{1,i} \leq \phi \leq \phi_{u,i} \ \& \ \theta_{1,j} \leq \theta \leq \theta_{u,j} \right\} \subset \Omega \quad (2)$$

with i=1, ... μ and j=1, ... ν . (3)

Here, the following applies:

$$\Omega = \bigcup_{(i)} \bigcup_{(j)} \Omega_{ij} \quad (4)$$

The number of sectors results from formula (3) as μ*ν.

Figure 2:
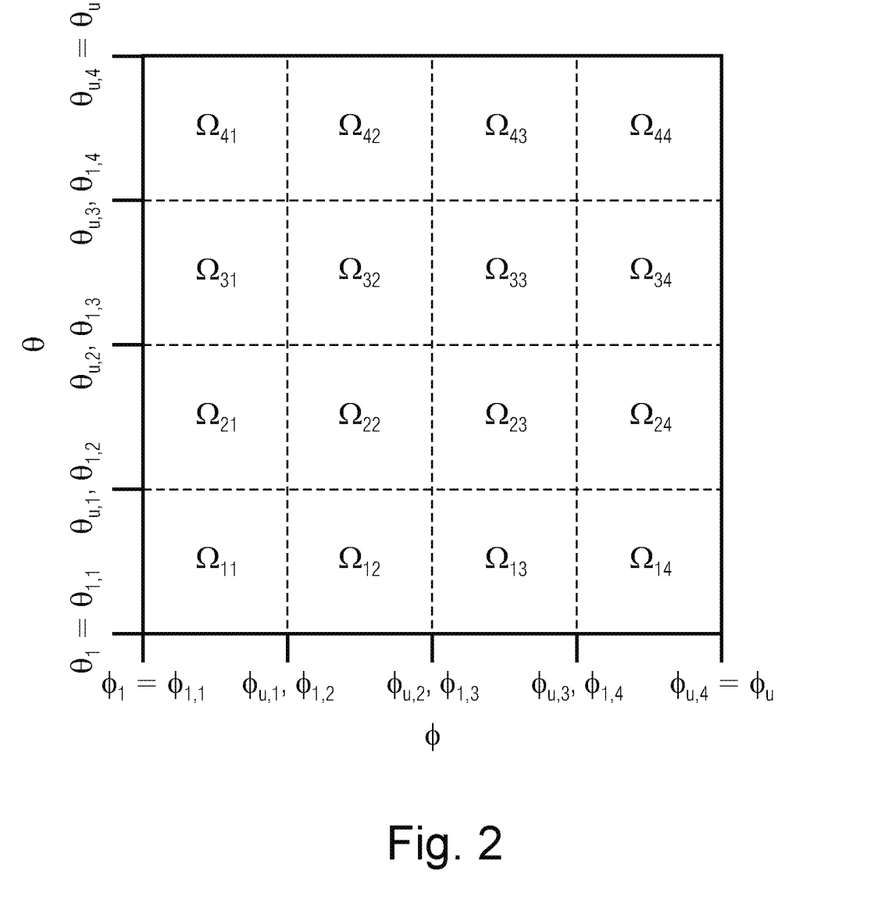
FIG. 2 shows a drawing of an irradiation region and the decomposition thereof into 16 sectors.

FIG. 2 exemplarily shows the partitioning of the irradiation region $\Omega$ (in accordance with definition (1)) into 16 sectors $\Omega_{ij}$ (in accordance with the definition in (2)), with μ=ν=4.

The following directional characteristic is associated to the sector $\Omega_{ij}$:

$$\vec{C}_k = \vec{C}_k(\vec{\omega}) = \vec{C}_k(\phi, \theta) = \begin{pmatrix} C_k^{(co)} \\ C_k^{(cross)} \end{pmatrix} \text{ with } k = \nu*(j-1)+i, \quad (5)$$

with the co-polarizing $C_k^{(co)}$ component and the cross-polarizing component $C_k^{(cross)}$.

The directional characteristic comprises its global magnitude maximum in the interval $\phi_{1,i} \leq \phi \leq \phi_{u,i}$ and $\theta_{1,j} \leq \theta \leq \theta_{u,j}$.

The association between (i, j) and k in formula (5) can be selected as desired as long as the following applies: max{k}=μ*ν. An alternative association is: k=μ*(i−1)+j.

The directional characteristics are set by a corresponding feed network 9. Every signal input (alternative term: input port) 20 of the feed network 9 here corresponds with a certain directional characteristic 7, as is outlined in FIG. 1 for a multibeam antenna.

The directional characteristics $\vec{C}_k$ particularly are so-called port directional characteristics. In one implementation, the feed network 9 is an eigenmode network (see, for example, [6].) In a further implementation, the feed network 9 is realized as a Butler matrix (see, for example, [7]) the signal inputs 20 of which correspond with mutually orthogonal feed vectors. Alternatively, the network 9 may generate feed vectors oriented to one another in any way.

Figure 3:
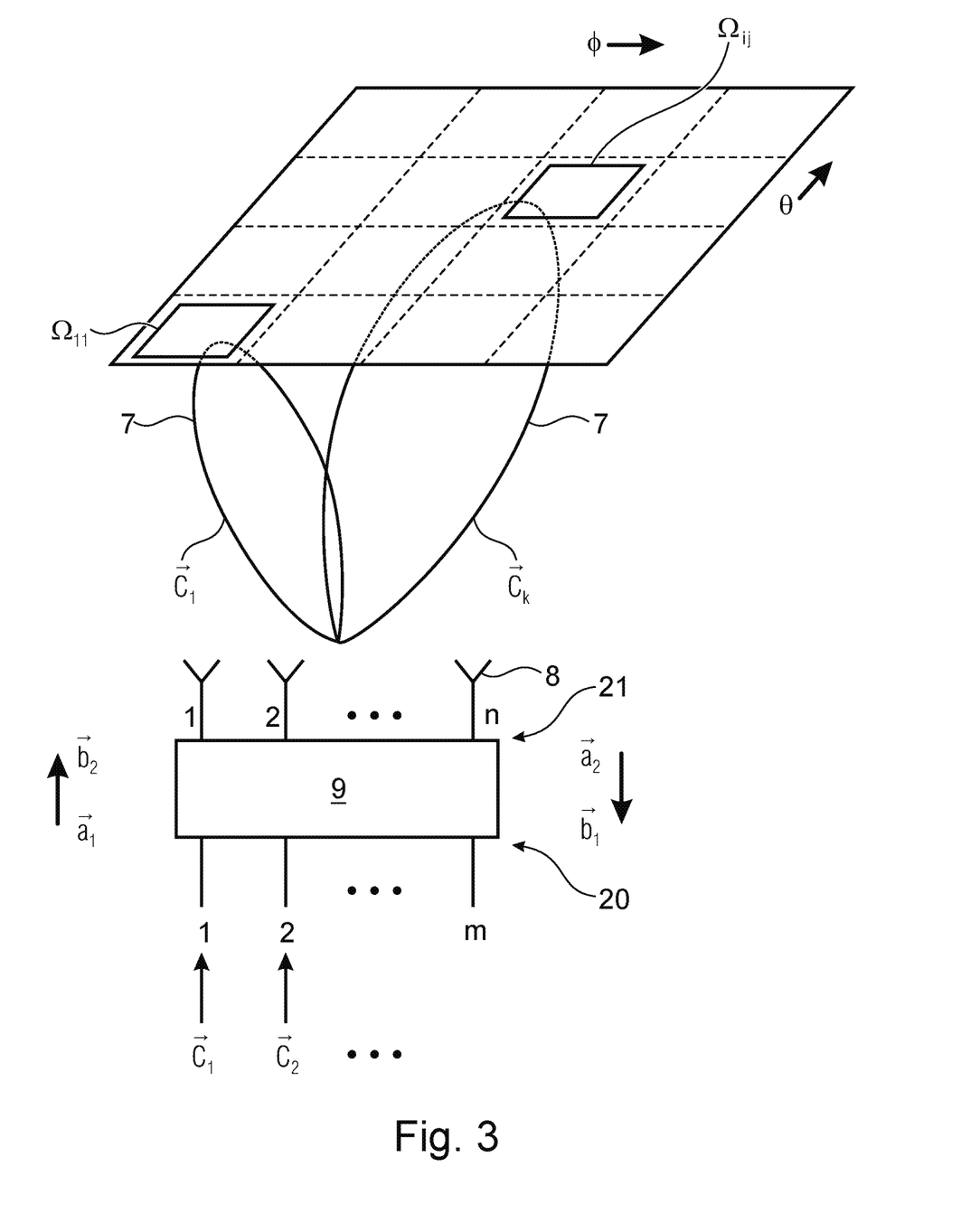
FIG. 3 shows a drawing of the association of directional characteristics to sectors of the irradiation region.

In FIG. 3, each port at the input (i.e. each signal input) 20 of the antenna device 3 or the feed network 9 corresponds with a directional characteristic $\vec{C}_k$ in accordance with equation (5), resulting in a radiation maximum in the sector $\Omega_{ij}$ (in accordance with equation (2)).

Here, the multibeam antenna, for example, as an antenna device 3 comprises n antenna elements which are connected to the n antenna inputs 21 of the feed network 9 and using which m signal inputs 20 are excited or switched.

Sending out signals via the antenna device or the antenna elements 8 thereof will be described in connection with FIG. 3 (see both vectors on the left-hand side with the arrow pointing upwards).

The following is assumed:

$$\vec{a}_{1,k} = \begin{pmatrix} 0 \\ \vdots \\ 1 \\ \vdots \\ 0 \end{pmatrix} \quad (6)$$

be the input vector which will excite only the k-th input port 20 (bottom level of the feed network 9). Using the scattering matrix of the feed network 9:

$$\tilde{S} = \begin{pmatrix} \tilde{S}_{11} & \tilde{S}_{12} \\ \tilde{S}_{21} & \tilde{S}_{22} \end{pmatrix} \quad (7)$$

the result will be the excitation vector at the output of the network (top level with the antenna elements 8):

$$\vec{b}_{2,k} = \vec{q}_k = \tilde{S}_{21} \vec{a}_{1,k} \quad (8)$$

with the vector $\vec{q}_k$ causing the directional characteristic $\vec{C}_k$.

When several signal inputs 20 (an alternative term would be ports) are fed at the same time, weighted superpositioning of the directional characteristics associated to the ports 20 will take place. The directional characteristics are combined with one another for emitting the excitation signals.

In the example of FIG. 3 (left side), the input vector $\vec{a}_1$ of formula (8) as the vector of the excitation signal is partitioned proportionately to the feed vectors $\vec{q}_i$.

The receive case will be discussed using the vectors on the right-hand side (connected by the schematic arrow pointing downwards) of FIG. 3, wherein the input vector $\vec{a}_2$ will be decomposed in correspondence with equation (9) into its portions of the individual directional characteristics 7.

When a signal is received from a certain direction, the vector $\vec{a}_2$ will be present at the top level of the feed network 9.

Since the network 9 in the implementation described here is a passive one, the following applies:

$$\tilde{S}_{12} = \tilde{S}_{21}^T.$$

Consequently, $\vec{a}_2$ will transform to the bottom level of the feed network 9 as follows:

$$\vec{b}_1 = \tilde{S}_{12}\vec{a}_2 = \tilde{S}_{21}^T \vec{a}_2 = \begin{pmatrix} \vec{q}_1^T \\ \vdots \\ \vec{q}_k^T \\ \vdots \\ \vec{q}_m^T \end{pmatrix} \quad (9)$$

The term $\vec{q}_k^T \vec{a}_2$ thus corresponds to the projection of the vector of the receive signals of the antenna elements 8 onto the vector $\vec{q}_k$ resulting in the directional characteristic $\vec{C}_k$. $\vec{a}_2$ is thus decomposed into the portions occurring in the individual $\vec{C}_k$.

It is assumed that the vectors $\vec{q}_k$ and $\vec{q}_l$ with (k, l)= 1, . . . m and k unequaling l are orthogonal in pairs. In addition, a signal is to be received from the main radiating direction of the characteristic $\vec{C}_k$. Thus, $\vec{a}_2 = c\vec{q}^*_k$ applies with any real constant c>0, which is to be understood to be a measure of the receive amplitude.

Then, $\vec{b}_1 = c\vec{a}_{1,k}$ will result. This means that only at the antenna input 21 there is a signal applied, corresponding to the directional characteristic $\vec{C}_k$. In the remaining characteristics $\vec{C}_l$ (l≠k), there are no signal portions contained.

Consequently, using the signal $\vec{b}_1$ which describes the receive signal $\vec{a}_2$ subdivided in correspondence with the individual directional characteristics, the direction of incidence of the respective signal received can be deduced.

The method for identifying in one implementation is as follows:

- A directional characteristic $\vec{C}_k$ is switched. Here, in one implementation, particularly one of the input ports 20 of the feed network 9 is selected and connected to the signal processing device 5 or the signal source 11.
- The antenna device 3 sends out an excitation or request signal via the directional characteristic selected.
- The transponders 2 (or RFID tags as examples of the transmitters described here) reached, or excited, or woken-up with the directional characteristics returns a response signal which contains, among other things, the identification of the transponder.
- The response signal is received via the antenna device and that part of the signal corresponding with the selected directional characteristic $\vec{C}_k$ is available for the reader as an implementation of the signal processing device 5.
- The reader 5 evaluates the response signal and makes available the identification of the transponder and a measure of the strength of the signal (RSSI value) received.

Thus, the transponder (generally the transmitter) can be associated to the currently selected (or switched) directional characteristic.

This process is performed for several directional characteristics 7. This means that the signal portions in the individual $\vec{C}_k$ are read out one after the other and the transponder signals or amplitude magnitudes can be associated to the directional characteristics. In total, a vector for the position of the transmitter is setup. The values of the inputs result from the magnitudes of the field strengths of the respective signals received and the basic vectors result from the associated directional characteristics, for example the respective direction of the beam.

Figure 4:
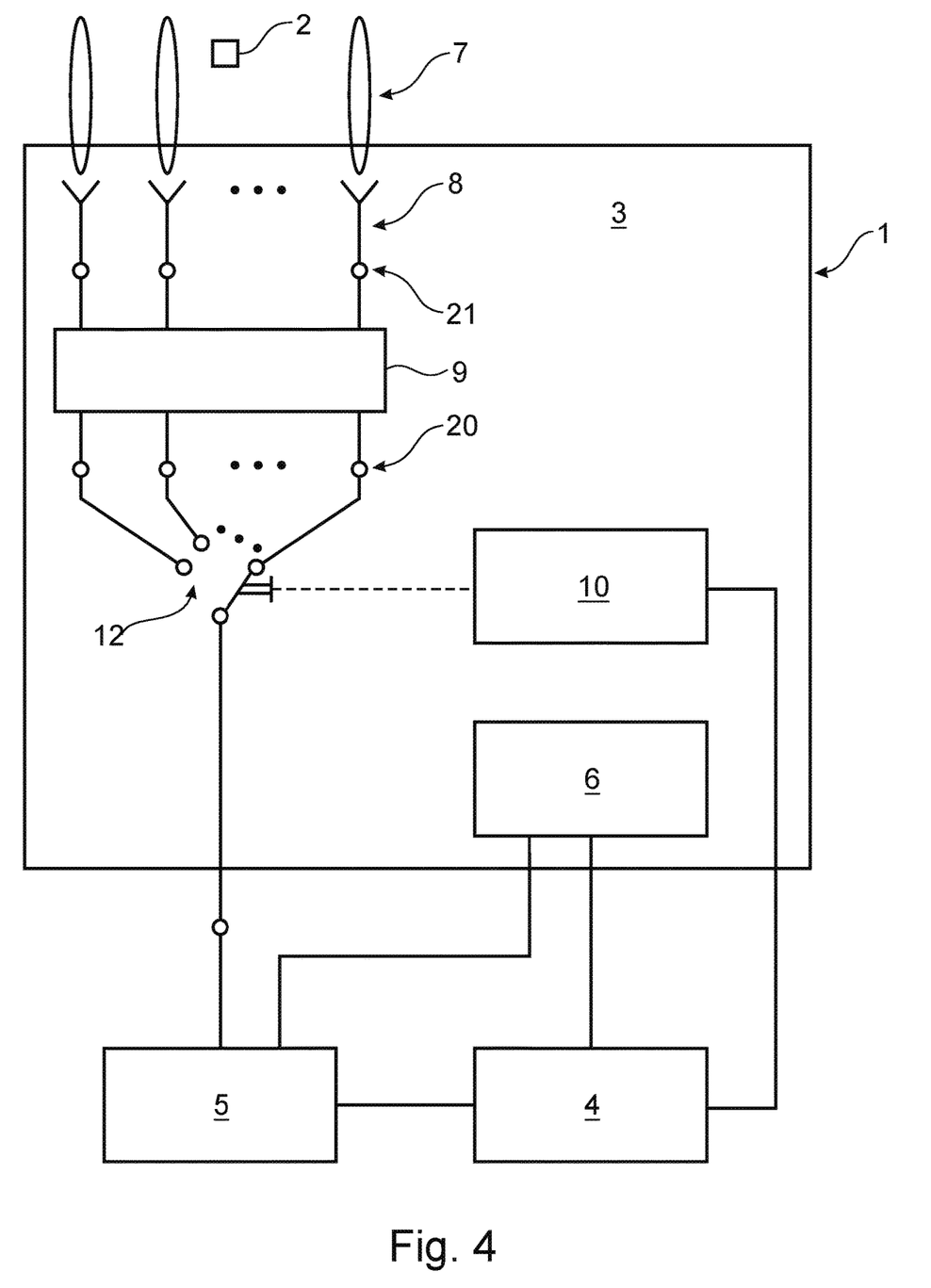
FIG. 4 shows a schematic illustration of an alternative implementation of the device.

FIG. 4 shows an alternative implementation of the device 1. The antenna device 3 here is also implemented as a multibeam antenna and comprises the control logic 10 and the data processing device 6 (alternatively also referred to as computing unit).

What follows is a consideration of evaluating the signals received or establishing the information on the position of the transmitter 2.

In order to be able to determine the direction of the transponders (or generally transmitters, irrespective of whether they are active or passive transmitters), it would be easier for the response signals (or generally the signals received) to be present in a complex form, i.e. including magnitude and phase. A conventional RFID reader (or RFID receiver), however, only makes available amplitudes in the form of RSSI values. When using the inventive device and partitioning of the irradiation region Ω into the individual sectors $\Omega_{ij}$ in accordance with equations (2) and (4), the complex signals at the antenna elements 8 can be deduced, as will be discussed below.

Instead of the complex signals $\vec{b}_1$ (cf. equation (9) and FIG. 3), in correspondence with the identification of the transmitter or RFID tag as described above, there are the amplitudes of the individual components of $\vec{b}_1$. The following vector is obtained:

$$\hat{\vec{b}}_1 = \begin{pmatrix} \hat{b}_{1,1} \\ \vdots \\ \hat{b}_{1,k} \\ \vdots \\ \hat{b}_{1,m} \end{pmatrix} = \begin{pmatrix} |\vec{q}_1^T \vec{a}_2| \\ \vdots \\ |\vec{q}_k^T \vec{a}_2| \\ \vdots \\ |\vec{q}_m^T \vec{a}_2| \end{pmatrix} \vec{a}_2. \quad (10)$$

Like $\vec{b}_1$, the vector $\hat{\vec{b}}_1$ is also dependent on the direction of incidence of the receive signal. Due to the unambiguous association of a directional characteristic $\vec{C}_k$ to a certain irradiation region $\Omega_{ij}$, however, an unambiguous vector of RSSI values $\hat{\vec{b}}_1$ is to be associated to each direction of incidence.

For a certain direction of incidence $\vec{\omega}_0$, $\hat{\vec{b}}_1(\vec{\omega}_0)$ will result only for $\vec{\omega} = \vec{\omega}_0$, but for no other directions of incidence. The phase of the signals thus is hidden inherently in the individual directional characteristics. This means that a representation can be defined as follows:

$$f: \hat{\vec{b}}_1(\vec{\omega}) \mapsto \vec{b}_1(\vec{\omega}) \quad (11)$$

and $$f: \hat{\vec{b}}_1(\vec{\omega}) \mapsto \vec{a}_2(\vec{\omega}) \quad (12)$$

In order to be able to make the association between $\hat{\vec{b}}_1(\vec{\omega})$ and $\vec{b}(\vec{\omega})$ or $\vec{a}_2(\vec{\omega})$, the possible complex vectors for different angles of incidence have to be established at first. This means that the directional characteristic and the spatial distribution of the receive sensitivity (or usually also the transmit sensitivity thereof) has to be established. This may be done by simulating or measuring the array where the vectors for all the angles of incidence are recorded over the irradiation region Ω—in accordance with the definition in (1). The irradiation region here is passed in a discrete manner so that the final result is a countable (finite) set of known angles of incidence $\vec{\omega}_l$ and, thus, vectors $\vec{b}_1^{(s)}(\vec{\omega}_l)$ and $\vec{a}_2^{(s)}(\omega_l)$. The superscript (s) indicates that vectors established for discrete angles of incidence are concerned. In principle, these are steering vectors.

The association to the complex vector corresponds to a search where the complex vector $\vec{b}'_1{}^{(s)} = \tilde{S}^T \vec{a}'_2{}^{(s)}$ is established in a least square error way, for which the norm:

$$\|\hat{\vec{b}}'_1 - \hat{\vec{b}}'_1{}^{(s)}(\vec{\omega}_l)\| \qquad (13)$$

with the following vector:

$$\hat{\vec{b}}_1^{(s)}(\vec{\omega}_l) = \begin{pmatrix} |b_{1,1}^{(s)}(\vec{\omega}_l)| \\ \vdots \\ |b_{1,k}^{(s)}(\vec{\omega}_l)| \\ \vdots \\ |b_{1,m}^{(s)}(\vec{\omega}_l)| \end{pmatrix} = \begin{pmatrix} |\vec{q}_1^T \vec{a}_2^{(s)}(\vec{\omega}_l)| \\ \vdots \\ |\vec{q}_k^T \vec{a}_2^{(s)}(\vec{\omega}_l)| \\ \vdots \\ |\vec{q}_m^T \vec{a}_2^{(s)}(\vec{\omega}_l)| \end{pmatrix} \qquad (14)$$

becomes minimal.

This implies:

$$\left\| \hat{\vec{b}}_1 - \hat{\vec{b}}'_1{}^{(s)} \right\| = \min_l \left\| \hat{\vec{b}}_1 - \hat{\vec{b}}_1^{(s)}(\vec{\omega}_l) \right\| \qquad (15)$$

As can be seen from equation (14), the vectors $\vec{a}_2^{(s)}(\vec{\omega}_l)$ at the antenna foot points can be measured on the one hand and the vectors $\vec{b}_1^{(s)}(\vec{\omega}_l)$ be established using the scattering matrix $\tilde{S}_{21}^T$ by means of computation. Consequently, it is sufficient to determine the directional characteristics of the individual antenna elements in the array, with no feed network. On the other hand, the port directional characteristics of the array, i.e. including the feed network, can be measured and the vectors $\vec{b}_1^{(s)}(\vec{\omega}_l)$ be established directly.

The angle of incidence $\vec{\omega} \in \{\vec{w}_l\}$ results directly from the complex vector $\vec{b}'_1{}^{(s)}$ or $\vec{a}'_2{}^{(s)}$ or from any direction estimation algorithm applied to the vector. It is also possible to determine a temporal mean value across several successive angles of incidence which are established over several switching cycles. Thus, the variance of the estimated angle and, consequently, the measuring uncertainty decrease. In practice, side maximums of the directional characteristics present are usually to be limited to a certain maximum level relative to the level of the main maximum in order to be robust to possible uncertainties caused by superimposed noise. Otherwise, there may be ambiguities when determining the direction.

In order to make functions (11) and (12) unambiguous, in one implementation, it is provided for to use a multibeam antenna the directional characteristics of which comprise an unambiguous global maximum and, across all the sectors, no symmetry in the form of another global maximum within the irradiation region. The combination of a typical or conventional RFID reader with a corresponding multibeam antenna allows drawing conclusions as to the complex-value receive signals, without having to interfere in the reader.

FIG. 4 shows an exemplary architecture of a corresponding setup of the device 1 by means of which the available directional characteristics $\vec{C}_k$ can be read out in accordance with the procedure described before and the angle of incidence of the identified tags (or transmitter) 2 can be determined. Apart from the antenna elements 8 and feed network 9, the multibeam antenna 3 comprises a radio-frequency switch (RF switch) 12 and control logic 10. Using the control logic 10, the desired port directional characteristic $\vec{C}_k$ (cf. definition (5)) is adjusted using the RF switch 12. The RF signal to be transmitted as an excitation signal is provided by the external RFID reader 5 (which consequently comprises the signal source 11 of the implementation of FIG. 1) via an RF signal connection, and the receive signal for the RFID reader 5 is provided. A, relative to the antenna device 3, external control device 4 allows controlling the reader 5 and the multibeam antenna 3. The data processing device 6 as part of the antenna device 3 determines the direction of incidence of the transponder signals in accordance with equation (13). The RSSI values and the transponder identification are obtained from the RFID reader 5. In typical installations of RFID readers 5 with a control unit, the illustrated implementation is of advantage in that only the antenna present has to be replaced by the antenna device 3 comprising control logic 10 and the data processing device 6—no other additional components are required.

The invention is to be described below in other words:

In one implementation, the invention allows establishing information on a position of the transmitter, the information being at least a statement on the direction of the transmitter. This is done based on RSSI values (or, generally, only with amplitude values of the signals received) in combination with a multibeam antenna.

The following advantages result, among others:

When using a computing unit or data processing device which is accommodated in one implementation in the multibeam antenna, in one implementation a single RF path between multibeam antenna and RFID reader is sufficient for estimating the direction.

This means that, in one implementation, only a single RFID reader comprising a single port is used. Such a reader generally is cheaper than an RFID reader having several ports. In addition, in one implementation, no additional infrastructure components for switching and computing are necessary since switching and estimating the direction are covered functionally by the multibeam antenna itself.

The number of antenna elements or directional characteristics and the partitioning of the irradiation region may be selected as desired. With an increasing number of elements and sectors, the precision of estimating the direction can be increased. This means that it can be adapted to the respective case of application.

Any conventional (commercial) standard RFID reader can be used as the signal processing device. These provide an RSSI value for each transponder identified.

In accordance with the invention, using an antenna device with different switchable or selectable directional characteristics (in one implementation, the multibeam antenna) and corresponding partitioning of the irradiation region, it is possible to dispense with measuring complex signals. A part of the signal processing is performed by the antenna device and the directional characteristics thereof so that the RSSI values (or, generally, the amplitude values) are sufficient for determining the position or at least estimating the direction.

All in all, the following advantages result:

The precision of the results does no longer, or only to a limited extent, depend on the directional effect of the individual antenna elements. This is based on the fact that the signals received with the individual directional characteristics and, thus, the individual antenna elements are processed altogether to form a vector for the position of the transmitter.

Compared to solutions of mechanical tracking of directional antennas, the invention allows a more compact realization with low response times, in addition without mechanical expenditure or wear. This particularly applies to the implementation where the antenna device is a patch antenna.

Compared to solutions where several receive nodes are distributed in space, a single receive node is sufficient. A signal processing device, like an RFID reader, for example, is consequently sufficient. The precision is not determined exclusively by the number of nodes, but by the number of antenna elements in the array and the number of sectors.

Technical fields of application of the invention are, for example, logistics, production, gate passage and others, including bulk reading (detecting many transponders within a short time), automized stock taking or identity checks in persons (like in healthcare).

Although some aspects have been described in the context of a device, it is clear that these aspects also represent a description of the corresponding method, such that a block or element of a device also corresponds to a respective method step or a feature of a method step. Analogously, aspects described in the context of or as a method step also represent a description of a corresponding block or item or feature of a corresponding device. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software or at least partly in hardware or at least partly in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier. In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier or the digital storage medium or the computer-readable medium is typically tangible and/or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured to or adapted to perform one of the methods described herein.

A further embodiment comprises a computer having installed thereon the computer program for performing one of the methods described herein.

A further embodiment according to the invention comprises a device or a system configured to transfer a computer program for performing one of the methods described herein to a receiver. The transmission can be performed electronically or optically. The receiver may, for example, be a computer, a mobile device, a memory device or the like. The device or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be a universally applicable hardware, such as a computer processor (CPU), or hardware specific for the method, such as ASIC, or a microprocessor, like in the form of an ARM architecture.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Kalis et al., "Direction Finding in IEEE802.11 Wireless Networks", IEEE Transactions on Instrumentation and Measurement, vol. 51, no. 5, pp. 940-948, 2002.

[2] B. N. Hood et al., "Estimating DoA From Radio-Frequency RSSI Measurements Using an Actuated Reflector, IEEE Sensors Journal, vol. 11, no. 2, pp. 413-417, 2011.

[3] G. Giorgetti et al., "Single-Anchor Indoor Localization Using a Switched-Beam Antenna", IEEE Communications Letters, vol. 13, no. 1, pp. 1-3, 2009.

[4] M. Passafiume et al., "On the duality of Phase-based and Phase-less RSSI MUSIC algorithm for Direction of Arrival estimation", Proc. of the 3rd International Conference on Circuits, Systems, Communications, Computers and Applications (CSCCA), pp. 48-54, 2014.

[5] D. L. Nguyen, "Switched Beam Array Antenna for 2.45 GHz RFID Localisation", Dissertation, The University of Hull, 2011.
[6] C. Volmer et al., "An Eigen-Analysis of Compact Antenna Arrays and Its Application to Port Decoupling", IEEE transactions on antennas and propagation, vol. 56, no. 2, pp. 360-370, 2008.
[7] Shelton, J. and Kelleher, K. S., "Multiple beams from linear arrays", IRE transactions on antennas and propagation, vol. 9, no. 2, pp. 154-161, 1961.

The invention claimed is:

1. A device for determining at least one piece of information on a position of at least one transmitter,
comprising an antenna device, a signal processing device and a data processing device,
wherein the antenna device comprises a feed network having a plurality of antenna inputs and a plurality of signal inputs,
wherein the antenna device comprises a multibeam antenna device comprising a plurality of antenna elements,
wherein each of the antenna inputs is connected to one of the antenna elements,
wherein the antenna device comprises several different directional characteristics,
wherein the directional characteristics each relate to at least a set of spatially different receive sensitivities of the antenna device,
wherein the antenna device is configured to receive for each of a plurality of the directional characteristics at least one signal from the transmitter,
wherein the several different directional characteristics are selected for receiving the at least one signal from the transmitter for each of the plurality of the directional characteristics one after another by connecting the signal processing device to different signal inputs of the plurality of signal inputs,
wherein the signal processing device is configured to process the signals received by the antenna device and to establish for each of the signals an amplitude value of a field strength of the respective signal, and
wherein the data processing device is configured to establish the information on the position of the transmitter based on the plurality of the directional characteristics and based on the amplitude values established from the signals associated with one of the plurality of the directional characteristics.

2. The device in accordance with claim 1,
the device comprising a control device,
wherein the control device is configured to switch different directional characteristics for receiving signals emanating from the transmitter, and
wherein the data processing device is configured to establish the information on the position of the transmitter based on the switched directional characteristics and the associated amplitude values established.

3. The device in accordance with claim 1,
wherein the data processing device is configured to establish a statement on a direction of the transmitter relative to the antenna device as information on the position of the transmitter from the amplitude values established in a vector form and data on the directional characteristics.

4. The device in accordance with claim 1,
wherein the antenna device is configured such that the directional characteristics each comprise a global maximum which is located each in a certain sector, determined by a pair of an azimuth angle and a co-elevation angle, in an irradiation region associated to the antenna device.

5. The device in accordance with claim 4,
wherein the antenna device is configured such that the directional characteristics each comprise a side maximum which is located each in a sector differing from that sector where the global maximum is located, and which comprises a predeterminable level distance to a level of the global maximum.

6. The device in accordance with claim 4,
wherein the antenna device is configured such that the directional characteristics each comprise a side maximum which is located each in the same sector as the global maximum and which comprises a predeterminable level distance to a level of the global maximum.

7. The device in accordance with claim 1,
wherein the signal processing device is an RFID reader which generates a "received signal strength indication" (RSSI) value as an amplitude value of the field strength of the signals received.

8. The device in accordance with claim 1,
wherein the signal processing device is configured to identify the transmitter.

9. The device in accordance with claim 2,
the device comprising a signal source,
wherein the signal source is configured to generate an excitation signal, and
wherein the control device is configured to switch a respective directional characteristic for radiating the excitation signal.

10. The device in accordance with claim 9,
wherein the control device is configured to switch the directional characteristic switched for radiating the excitation signal as a directional characteristic for receiving the signal emanating from the transmitter.

11. The device in accordance with claim 1,
wherein the antenna device comprises several antenna elements.

12. The device in accordance with claim 1,
wherein the antenna device comprises a feed network, and
wherein the feed network causes different directional characteristics of the antenna device.

13. The device in accordance with claim 12,
wherein the feed network is configured to output the signals received from the antenna device for each of the plurality of the directional characteristics separately.

14. The device in accordance with claim 1,
wherein the antenna device is implemented as a multibeam antenna.

15. A method for determining at least one piece of information on a position of at least one transmitter using an antenna device, a control device, a signal processing device and a data processing device, wherein the antenna device comprises a feed network having a plurality of antenna inputs and a plurality of signal inputs, wherein the antenna device comprises a multibeam antenna device comprising a plurality of antenna elements, and wherein each of the antenna inputs is connected to one of the antenna elements, the method comprising the steps of:
using an antenna device comprising several different directional characteristics for receiving for each of a plurality of the directional characteristics at least one signal from the transmitter, wherein the directional characteristics each relate to at least a set of spatially different receive sensitivities of the antenna device, wherein the several different directional characteristics are selected for receiving the at least one signal for each of the plurality of the directional characteristics from the transmitter one after another by connecting the signal processing device to different signal inputs of the plurality of signal inputs, using a signal processing device for processing the signals received by the antenna device and to establish for each of the signals an amplitude value of a field strength of the respective signal, and using a data processing device for establishing the information on the position of the transmitter based on the plurality of the directional characteristics and based on the amplitude values established from the signals associated with one of the plurality of the directional characteristics.

16. A device for determining at least one piece of information on a position of at least one transmitter, comprising an antenna device, a control device, a signal processing device and a data processing device, wherein the antenna device comprises a feed network having a plurality of antenna inputs and a plurality of signal inputs, wherein the antenna device comprises a multibeam antenna device comprising a plurality of antenna elements, wherein each of the antenna inputs is connected to one of the antenna elements, wherein the antenna device comprises several different directional characteristics, wherein the directional characteristics each relate to at least a set of spatially different receive sensitivities of the antenna device, wherein the antenna device is configured to receive for each of a plurality of the directional characteristics at least one signal from the transmitter, wherein the antenna device comprises a feed network, wherein the several different directional characteristics are selected for receiving the at least one signal from the transmitter for each of the plurality of the directional characteristics one after another by connecting the signal processing device to different signal inputs of the plurality of signal inputs, the feed network causing different directional characteristics of the antenna device, wherein the feed network is configured to output signals received from the antenna device for each of the plurality of the directional characteristics separately, wherein the antenna device is configured such that the directional characteristics each comprise a global maximum which is located each in a certain sector, determined by a pair of an azimuth angle and a co-elevation angle, in an irradiation region associated to the antenna device, wherein the antenna device is configured such that the directional characteristics each comprise a side maximum which is located each in a sector differing from that sector where the global maximum is located, and which comprises a predeterminable level distance to a level of the global maximum, wherein the control device is configured to switch the different directional characteristics caused by the feed network for receiving signals emanating from the transmitter, wherein the signal processing device is configured to process the signals received by the antenna device and to establish for each of the signals an amplitude value of a field strength of the respective signal, wherein the data processing device is configured to establish the information on the position of the transmitter based on the plurality of the directional characteristics and based on the amplitude values established from the signals associated with one of the plurality of the directional characteristics, and wherein the data processing device is configured to establish a statement on a direction of the transmitter relative to the antenna device as information on the position of the transmitter from the amplitude values established in a vector form and data on the directional characteristics.

* * * * *